United States Patent Office 3,730,907
Patented May 1, 1973

3,730,907
PROCESS OF PRODUCTION OF DEFOAMER
COMPOSITIONS
Hugh J. S. Shane, John E. Schill, and John W. Lilley, Guelph, Ontario, Canada, assignors to Hart Chemical Limited, Guelph, Ontario, Canada
No Drawing. Filed Dec. 21, 1971, Ser. No. 210,547
Int. Cl. B01d 17/00
U.S. Cl. 252—358                            17 Claims

ABSTRACT OF THE DISCLOSURE

A defoamer composition is prepared by a series of steps including forming a mixture of an aliphatic diamide and a low viscosity mineral oil in which the aliphatic diamide has a particular size of from 4 to 7 on the Hegman scale, and ageing the mixture at an elevated temperature and over an extended period of time while agitating the mixture.

The present invention relates to the production of a defoaming composition, more particularly to the production of a defoaming composition having particular use in pulp mills.

In a number of locations in a pulp mill, foam is formed and usually it is desired to control such foam by the use of a suitable additive composition. The problem of foaming is not confined to pulp mills and a number of formulations have been suggested to combat foaming in many environments.

In Canadian Pat. 508,856, there is disclosed a composition to inhibit the formation of foam in a dish-washing machine detergent, the composition containing a diamide and a mineral oil. There is described in copending application Serial No. 210,540 filed Dec. 21, 1971 a process of treatment of aqueous pulp mill liquors using compositions of this type.

There are a number of factors to be considered in the formulation of a commercially acceptable foam control material, especially for pulp mill use. A foam control material should have the ability to reduce an already formed foam to a low level in a short period of time and additionally the ability to prevent the formation of foam from the aqueous medium once the material is added, over an extended period of time. In addition, the product should have ready pumpability to enable to to be transferred from a storage area to the required location without the tendency to gel. Further, a long shelf life for the composition is an important factor, that is, the composition is an important factor, that is, the composition should show very little or no tendency to separate into its components upon storing over an extended period of time.

The present invention is concerned with a particular novel method of formation of a composition comprising an aliphatic diamide and a mineral oil and having such properties. In the aforementioned Canadian patent, there are described two processes of formation of such compositions. In the first process the amide is milled to the desired particulate form and the particles simply are dispersed in the oil. The second process involves melting the amide, mixing the molten material with the oil and cooling the mixture to form discrete particles of the solid amide in the oil.

It has been found that while the products formed by these processes do have antifoaming properties in pulp mill applications, as is disclosed in our copending application Serial No. 210,540 referred to above, these properties are considerably enhanced by employing the improved process of the present invention. Further, such prior art formulations have unsatisfactory shelf lives and have a tendency to gel in certain environments. By employing the process of the present invention, these problems are avoided and a versatile, satisfactory product is provided.

In accordance with the present invention, the composition is produced by a number of steps including forming a composition which is a dispersion of an aliphatic diamide of desired particle size in a low viscosity mineral oil, and subjecting the composition to an ageing step at an elevated temperature while maintaining the composition under agitation substantially throughout the ageing step. It has found that by forming the composition using this combination of steps the defoaming, shelf life and anti-gelling properties of the composition in pulp mill environments are considerably improved as compared to compositions formed by the prior art processes described above.

While there is an observed enhancement of properties present invention, the applicants cannot explain these unexpected effects. It is bound in some way to the ageing operations but the complex changes undergone by the composition during the ageing are not fully understood.

The diamide used in the process of the invention may be divided to the desired particle size in any suitable equipment. Generally, the diamide is milled while in admixture with the mineral oil to the desired particle size, utilizing, for example, a continuous rod mill. It is possible to provide the diamide of the required particle size by milling and then to blend the particulate diamide with the mineral oil. It is preferred, however, in the process of the present invention to mill the diamide while in admixture with the mineral oil since it has been found that a more uniform dispersion of the particulate diamide in the oil results, in contrast to the blending of pre-milled diamide and oil.

A particular continuous rod mill which may be used to reduce the diamide to the required particle size is a Microflow mill. The mill consists of a stationary horizontal cylinder with a rotor positioned in the chamber. The rotor carries a series of ploughs around the periphery and the leading edge of each plough is tapered to act as a scraper and lies along the length of the cylinder. A number of rods are held loosely in the rotor frame to act as the grinding media.

In the milling step, the diamide generally is reduced to an average particle size of 4 to 7 on the Hegman scale. Preferably, milling of the diamide in the oil is carried out to a Hegman value of 5 to 6.

The temperature of the milling operation generally is controlled at about 35 to 45° C. although temperatures differing from this range may be employed, depending on the quantity and nature of the amide and oil. Generally, the upper limit of temperature is that above which gelling of the material would take place or the melting point of the amide. Lower temperature limits are dictated by oil viscosity considerations.

Following the milling operation, the composition is subjected to an ageing step. The ageing step is carried out by maintaining the composition at an elevated temperature for an extended period. During the ageing step, the composition is maintained under agitation. If the composition is not agitated during the ageing step, then gelling of the composition occurs, thereby rendering the material commercially unacceptable.

The conditions of ageing vary greatly depending on the nature and quantities of the diamide and mineral oil and the presence or absence of any modifying materials. Typically, an elevated temperature of at least 40° C. is employed generally up to about 80° C., although temperatures below 65° C. usually are preferred and the period of time over which the composition is subjected to the elevated temperature is dependent on the temperature employed. The ageing usually involves heating for several hours. The ageing may be carried out at a single temperature, at differing temperatures, or the composition may be subjected to an increasing temperature gradient. In a typical ageing operation, the composition is heated at a temperature of about 45° C. for about 6 hours, followed by heating at a temperature of about 60° C. for about 1 hour.

The ageing step has a number of effects on the properties of the compositions. Ageing enhances the defoaming properties and this enhancement is achieved with only a short ageing period of typically 1 to 2 hours and further ageing does not affect the defoaming properties significantly. Also enhanced are the shelf life and gelling properties of the compositions and the longer ageing periods of several hours produce significant improvements in these properties.

As indicated above, the present invention is concerned with the production of a foam control formulation in which the principal active ingredient is a diamide dispersed in a low viscosity mineral oil. The diamide is aliphatic and is an amide derivative of a polymethylene diamine containing from 2 to 6 methylene groups. The amide derivatives are formed with fatty acids and such fatty acids are long chain aliphatic carboxylic acids containing generally from 10 to 22 carbon atoms in the chain.

The acids may contain straight or branched chains, may have a degree of unsaturation and may contain cycloaliphatic rings. It is not essential that the same acid form the amide group at each end of the polymethylene chain. It is within the scope of the present invention to provide such mixed amides. Usually, however, the diamides are symmetrical.

Typical fatty acids used to form the aliphatic diamides are capric, lauric, myristic, palmitic, stearic, behenic, lauroleic, oleic, linoleic, linolenic, arachidic, palmitoleic, ricinoleic, petroselinic, vaccenic, oleostearic, licanic, gadoleic, arachinodonic, cetoleic and erucic acids.

A particularly preferred diamide component of compositions formed by the process of the present invention is ethylene bis-distearamide, that is, the diamide formed from stearic acid and ethylene diamine.

The quantity of diamide utilized in the composition depends on a number of factors, such as the particular amide, the nature of the mineral oil, the presence or absence of modifying agents in the composition and the type and nature of the pulp mill effluent being treated. Compositions containing a wide range of quantities of aliphatic diamide may be formed by the process of the invention.

Generally, from about 4 to 12% by weight of the total composition of diamide is sufficient. The use of higher quantities in the composition leads to no greater defoaming power and gives rise to gelling problems which impair the pumpability of the composition. These higher quantities of material, therefore, are avoided. The lower limit of quantity of diamide is the minimum which produces a commercially satisfactory result in a particular environment.

As indicated above, the particle size of the diamide is important to the provision of a commercially acceptable product and the particle size is controlled in the milling step.

The carrier for the active material is a low viscosity mineral oil. A wide variety of mineral oils may be used and the choice of a particular mineral oil depends on the particular diamide employed, as well as the nature of the liquid to be defoamed.

Mineral oils of a wide viscosity range may be employed. Generally, viscosities of above 100 SUS at 210° F. are avoided, due to their heavy nature, while generally a mineral oil of viscosity from 25 to 100 SUS at 210° F. is employed, preferably containing a majority of paraffinic materials.

A large number of mineral oils having these viscosity characteristics are commercially available and one such oil preferably used in formulating compositions in accordance with the process of the present invention is Shellflex 210, which has a viscosity of 39.6 SUS at 210° F.

In use, the compositions produced by the process of the present invention have a surface effect on the aqueous liquid treated and this effect only is diminished, and hence antifoaming control lessens, when the composition emulsifies. The compositions produced in accordance with the process of the invention are used as the mineral oil dispersions.

It may be desirable under certain conditions to include modifying ingredients in the composition of diamide and mineral oil. Such modifying agents may be included to improve the properties of the composition for a particular environment or to improve the versatility of the product with regard to its use in most pulp mill environments.

A typical modifying agent is a spreading agent, which may be present in a small quantity, such as, up to about 3% by weight of the composition. Usually, about 0.5 to about 1% of a spreading agent is sufficient.

A large number of spreading agents are known, and typically the spreading agent may be one or more anionic, cationic or non-ionic surfactants. The particular type of spreading agent will depend on the type of system in which the composition is used.

Examples of suitable anionic surfactants are fatty acids containing from about 12 to about 22 carbon atoms and soaps of such fatty acids. Examples of other suitable anionic surfactants are alkali metal salts of alkyl-aryl sulfonic acids, sulfated or sulfonated oils and alkali metal salts of short chain petroleum sulfonic acids.

Examples of suitable cationic surfactants are salts of long chain primary, secondary or tertiary amines, and quaternary salts.

Suitable non-ionic surfactants are condensation products of higher fatty alcohols with ethylene oxide, condensation products of alkylphenols with ethylene oxide, condensation products of fatty acid amides with ethylene oxide, polyethylene glycol esters of long chain fatty acids, ethylene oxide condensation products of polyhydric alcohol, partial higher fatty acid esters and their inner anhydrides, long chain polyglycols in which one hydroxyl group is esterified with a higher fatty acid and the other hydroxyl group is etherified with a low molecular weight alcohol. Additional non-ionic surfactants include sorbitans, spans, Tweens, lecithin and ethoxylated lecithins.

Small quantities of other modifiers, such as silicones may be added in some instances. The silicones, generally polysiloxanes, exhibit synergism with the other ingredients of the composition to enhance the defoaming characteristics of the composition. Such silicones when included are present in quantities up to about 2% of the total composition, although usually about 0.5 to about 1% of silicones may be used.

A large number of silicones are commercially available and the choice of the particular silicone is dependent on the particular environment to be treated. Silicones are organosiloxane polymers and usually are employed in the form of oils. Such silicone oils, preferably having a viscosity of 25 to 60,000 centistokes are employed in the formation of defoaming compositions in accordance with the present invention, and particular materials which may be used are dimethyl polysiloxanes.

These modifying materials, i.e., surfactants and silicones are added to the original mixture of mineral oil and diamide prior to the ageing operation, usually prior to the milling operation when the amide is milled together with the mineral oil.

It has been found that, while the product formed by the process of the invention is useful in controlling foam in a wide variety of pulp mill liquors, in certain instances further modifying agents are required. Such additional modifying agents include alkaline earth metal short chain petroleum sulfonates, and esters of α,β-unsaturated aliphatic acids, such acrylates. Where such additional modifying-modifying agents are added, quantities up to about 5% may be employed. The additional modifying agents generally are added to the composition after the ageing step indicated above, although in some instances they may be added prior to ageing.

The compositions produced by the process of the present invention have particular utility in the control of foaming in black liquor formed in a Kraft pulp mill. In the Kraft process for the production of wood pulp, wood chips are digested in a white liquor containing sodium sulphide and sodium hydroxide to dissolve from the wood chips a substantial part of the hemicelluloses, lignins and other extractable organic materials contained therein. The fibrous pulp so produced is separated from the resulting black liquor and is washed free from entrained black liquor in a brown stock washing operation. Foaming occurs at this phase of the operation and the products of the present invention have particular utility in controlling such foam. Methods of control of foam in pulp mill operations are described in copending application Serial No. 210,540, referred to above.

The invention is illustrated by the following examples:

EXAMPLE 1

A batch of materials consisting of 7% ethylene bis-distearamide, 1% Surchem 306 (calcium petroleum sulfonate), 0.5% Antifoam A (a dimethyl polysiloxane containing 4 to 4.5% $SiO_2$) and the balance Shellflex 210 (a mineral oil having a viscosity of 39.6 SUS at 210° F.) was charged to a kettle. The batch was cycled through a Microflow mill until the average particle size of the ethylene bis-distearamide was about 5 to 5½ on the Hegman scale, while the temperature of the mill effluent was maintained at about 35° to 45° C.

The composition after milling was transferred to a further kettle and the batch was heated to about 45° C with agitation and the batch was maintained at approximately this temperature with continued agitation for 6 hours. At the end of this time, the temperature of the batch was raised to 60° C. for one hour and agitation was continued. Following heating at 60° C. the batch was rapidly cooled to room temperature.

The defoaming properties of the composition formed in the above manner were determined in the following manner. An experimental foam property testing apparatus was set up. The apparatus consisted of a 4½ gallon battery jar full of water, immersed in which was a thermostatically-controlled immersion heater, a thermometer, an agitator and a cylindrical glassware holding vessel for black liquor. The black liquor was recycled through a small gear pump from the bottom and back to the top of the loading vessel, re-entering the vessel through a small spray nozzle. A recycle pump rate of 2320 mls./min. and a black liquor charge of 500 ccs. were chosen.

The water bath was heated to about 180° F. and maintained at this temperature throughout. The 500 ccs. of black liquor to be treated, also heated to 180° F., were poured into the holding vessel and the recycle pump was started. As the black liquor recycled through the system, a head of foam quickly was formed in the holding vessel.

As soon as the foam height reached 3 inches, exactly 0.03 ml. of the defoamer composition prepared in the above manner was syringed into the recycle stream. The effect of such addition on the foam was observed by taking foam height readings every 5 seconds for the first 35 seconds, every 10 seconds up to 60 seconds and every 20 seconds thereafter. The results are reproduced in the following Table I:

TABLE I

| Time (seconds) | Foam head (inches) |
|---|---|
| 0 | 3 |
| 5 | 0.5 |
| 10 | 0.6 |
| 15 | 0.75 |
| 20 | 1 |
| 25 | 1.1 |
| 30 | 1.1 |
| 35 | 1.5 |
| 40 | 1.6 |
| 50 | 1.8 |
| 60 | 2.25 |
| 80 | 3.5 |
| 100 | 4.75 |
| 120 | 6.25 |

It will be seen from this Table I that the composition prepared in accordance with the present invention possesses the defoaming properties of, first, the ability to reduce a head of foam rapidly to a low level and, second, the ability to inhibit the formation of foam over an extended period of time.

EXAMPLE 2

The composition of Example 1 was left to stand at room temperature over an extended period of time and the degree of separation of the components of the composition was measured. The results are reproduced in the following Table II:

TABLE II

| Time (days) | Separation (inches of oil on top of inches of composition) |
|---|---|
| 0 | 0. |
| 2 | 0. |
| 3 | 0. |
| 4 | Very slight. |
| 5 | Very slight. |
| 6 | Very slight. |
| 9 | Very slight. |
| 11 | 3/108. |
| 16 | 4/108. |
| 18 | 4/108. |
| 20 | 5/108. |
| 24 | 6/108. |
| 30 | 6/108. |
| 37 | 8/108. |
| 41 | 8/108. |
| 44 | 9/108. |
| 47 | 10/108. |
| 51 | 12/108. |
| 55 | 14/108. |
| 59 | 16/108. |
| 66 | 18/108. |

It will be seen from these results that the product of Example 1 has good stability against separation into its components over an extended period of time.

It was observed that upon stirring the composition after standing for approximately two months, the original composition readily was reformed and no sludge or compacted material-formation was observed.

Additionally, during the observations of stability of the product, there was no observed tendency of the product to gel.

In complete contrast, a sample of material formed by the process of Example I but omitting the ageing steps was found to gel completely upon standing for about 25 days. It was impossible to make stability observations for this sample in view of the gelling.

Therefore, the product formed in accordance with the present invention, including the ageing step, has superior stability and anti-gelling properties as compared with a product prepared by a process omitting the ageing step.

Modifications are possible within the scope of the invention.

What we claim is:

1. A process for the production of a defoaming composition which comprises the steps of: uniformly dispersing an aliphatic diamide having an average particle size from about 4 to 7 on the Hegman scale in a low viscosity mineral oil to form a composition containing an amount of from 4 to 12% by weight of the composition, said diamide being that of a polymethylene diamine having 2 to 6 methylene groups with at least one aliphatic fatty acid having from 10 to 22 carbon atoms in the chain, and subjecting said composition to ageing at an elevated temperature over an extended period of time while agitating said composition substantially throughout said ageing to provide a defoaming composition having enhanced defoaming properties as compared to the composition prior to ageing and which is stable to separation of its components and gel-formation.

2. The process of claim 1 wherein said composition is formed by mixing said diamide with said mineral oil and milling said mixture to said particle size.

3. The process of claim 2 wherein said mixture is milled to an average particle size of 5 to 6 on the Hegman scale.

4. The process of claim 2 wherein said milling is carried out at a temperature of about 35 to 45° C.

5. The process of claim 1 wherein said ageing step is carried out at a temperature of about 40° to about 80° C. over an extended period of time.

6. The process of claim 5 wherein said ageing step is carried out at a temperature from about 40° C. to about 65° C.

7. The process of claim 1 wherein said ageing step is carried out at two differing temperatures, the composition initially being subjected to a temperature of about 45° C. for about 6 hours followed by being heated at a temperature of about 60° C. for about 1 hour.

8. The process of claim 2 wherein said diamide is that formed from stearic acid and ethylene diamine.

9. The process of claim 1 wherein said mineral oil has a viscosity up to 100 SUS at 210° F.

10. The process of claim 2 wherein said mineral oil has a viscosity from 25 to 100 SUS at 210° F.

11. The process of claim 2 wherein said mineral oil has a viscosity from 25 to 100 SUS at 210° F. and said diamide is that formed from stearic acid and ethylene diamine.

12. The process of claim 2 wherein there is included in said mixture a small quantity of an anionic, cationic or non-ionic surfactant.

13. The process of claim 2 wherein there is included in said mixture a small quantity of a silicone.

14. The process of claim 2 wherein there is included in said mixture up to about 3% by weight of a spreading agent and up to about 2% by weight of a silicone.

15. The process of claim 14 wherein said silicone is a dimethyl polysiloxane.

16. The process of claim 2 including the further step of adding to said composition following said ageing up to about 5% total weight of at least one of an alkaline earth metal short chain petroleum sulfonate and an ester of an $\alpha,\beta$-unsaturated aliphatic acid.

17. A process for the production of a defoaming composition which comprises the steps of mixing together about 7% of ethylene bis-distearamide, about 1% of a calcium petroleum sulfonate, about 0.5% of a dimethyl polysiloxane oil containing 4 to 4.5% $SiO_2$ and the balance a mineral oil having a viscosity of about 40 SUS at 210° F. to form a mixture, milling said mixture to an average particle size of said ethylene bis-distearamide of about 5 to 5½ on the Hegman scale at a temperature of about 35° to 45° C., heating the composition formed in the milling to a temperature of about 45° C. and maintaining said composition at said temperature for about 6 hours while continuously agitating said composition, thereafter heating said composition to about 60° C. and maintaining said composition at said temperature for about 1 hour while continuously agitating said composition, and subsequently cooling said composition to ambient temperature.

References Cited
UNITED STATES PATENTS 2,854,417  9/1958  Edwards _____ 252—321

JOHN D. WELSH, Primary Examiner

U.S. Cl. X.R.

252—321